No. 739,829. PATENTED SEPT. 29, 1903.
W. M. CAIN.
SECURING MEANS FOR LOAD RETAINING STAKES.
APPLICATION FILED FEB. 2, 1903.
NO MODEL.
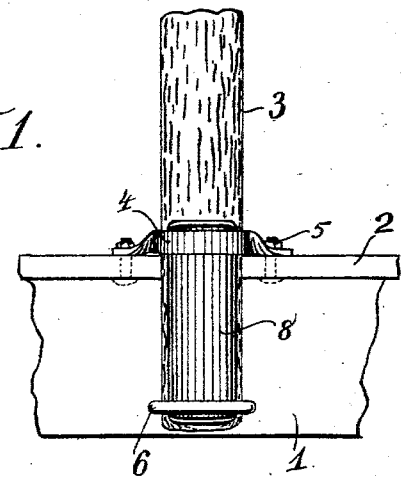
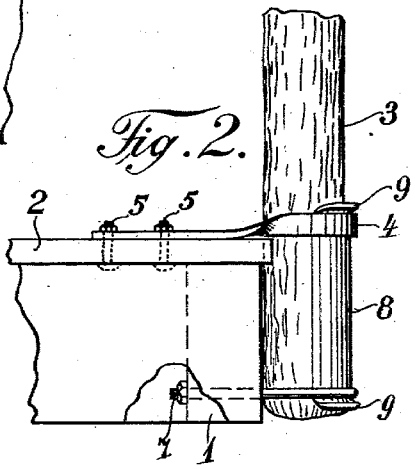
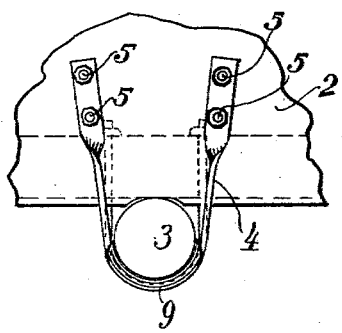
WITNESSES:
INVENTOR.
William Martin Cain
BY James T. Watson
ATTORNEY.

No. 739,829.	Patented September 29, 1903.

UNITED STATES PATENT OFFICE.

WILLIAM MARTIN CAIN, OF CARLTON, MINNESOTA.

SECURING MEANS FOR LOAD-RETAINING STAKES.

SPECIFICATION forming part of Letters Patent No. 739,829, dated September 29, 1903.

Application filed February 2, 1903. Serial No. 141,574. (No model.)

*To all whom it may concern:*

Be it known that I, WILLIAM MARTIN CAIN, a citizen of the United States, residing at Carlton, in the county of Carlton and State of Minnesota, have invented certain new and useful Improvements in Securing Means for Load-Retaining Stakes; and I do hereby declare the following to be a full, clear, and exact description of the invention, such as will enable others skilled in the art to which it appertains to make and use the same.

My invention relates to securing means for load-retaining stakes, and has for its object the provision of means which may be cheaply and easily made with the limited facilities usually available at logging-camps and which may be positioned without excessive boring and weakening of the load-supporting sills and which will rigidly secure the stake in practically permanent vertical position upon the load-bearing structure.

It consists, in combination with a load-supporting structure and a stake adapted to be supported thereon, of a U-shaped strap adapted to embrace said stake and secured at its ends to the upper face of said structure and a U-bolt adapted to embrace said stake at a lower plane than said strap and secured at its ends to the sill of said structure.

It also consists of certain other constructions, combinations, and arrangements of parts, as will be hereinafter described and claimed.

In the drawings, Figure 1 is a side elevation of a portion of a load-bearing structure, showing my invention secured thereto. Fig. 2 is an end elevation of the same. Fig. 3 is a top plan view of the same.

In the drawings, 1 is the side sill of a platform-car, upon which is laid the platform 2. A load-retaining stake 3 is secured to the side of said car by a U-shaped strap 4, embracing said stake and extending inwardly upon said platform and secured at its ends to said platform by bolts 5. Said stake is further secured in position by a U-bolt 6, embracing said stake at a lower plane than said strap and extending through said sill and secured thereto at each end by terminal nuts 7. A face-plate 8 is preferably interposed between said strap and U-bolt, or either of them, and the outer face of said stake to prevent said strap and U-bolt from cutting into said stakes.

The operation of my said invention is too obvious to require further explanation. It will be observed that its parts are capable of being easily constructed at any ordinary blacksmith-shop and that its arrangement does not materially weaken said sill.

Having now described my invention, what I claim, and desire to secure by Letters Patent, is—

1. In securing means for load-retaining stakes, the combination with a load-bearing structure and a stake adapted to be secured thereto, of a U-shaped strap, adapted to partly encircle said stake and extending inwardly along the upper face of said structure and secured thereto, a U-bolt, adapted to partly encircle said stake on a lower plane than said strap and extending inwardly through the side of said structure and secured thereto, and means for preventing said strap and U-bolt from cutting into said stake, substantially as described.

2. In securing means for load-retaining stakes, the combination with a load-bearing structure and a stake adapted to be secured thereto, of a U-shaped strap, adapted to partly encircle said stake and extending inwardly along the upper face of said structure and secured thereto, a U-bolt, adapted to partly encircle said stake on a lower plane than said strap and extending inwardly through the side of said structure and secured thereto, and a face-plate interposed between the outer face of said stake and the said strap and U-bolt for preventing said strap and U-bolt from cutting into said stake, substantially as described.

3. In securing means for load-retaining stakes the combination with a load-bearing structure provided with longitudinal side sills, and with a stake adapted to be secured thereto, of a U-shaped strap passed partly around said stake and extending inwardly along the upper face of said structure and bolted at each of its ends to said platform, a U-bolt passed around said stake on a lower plane than said strap and extending inwardly through said sill and secured thereto by terminal nuts upon each of its ends, substantially as described.

In testimony whereof I have hereunto affixed my signature in presence of two witnesses.

WILLIAM MARTIN CAIN.

Witnesses:
JAMES T. WATSON,
WELLINGTON M. BLEWETT.